INVENTORS.
RENÉ BUFFY
ADOLPHE TARTAR

United States Patent Office 3,425,398
Patented Feb. 4, 1969

3,425,398
APPARATUS FOR DISPENSING ARTIFICIAL FOOD TO YOUNG ANIMALS
Rene Buffy, Menetreux-le-Pitois, and Adolphe Tartar, Blendecques, France, assignors to S.A.B.E. Specialites Alimentaires pour le Betail, Societe Anonyme, Pas de Calais, France
Filed Oct. 28, 1966, Ser. No. 590,276
Claims priority, application France, Feb. 25, 1966, 51,115; July 18, 1966, 69,723; Sept. 1, 1966, 74,912
U.S. Cl. 119—51.11         8 Claims
Int. Cl. A01k 5/02, 9/00

The present invention relates to an apparatus for dispensing artificial food to young animals, for example sucking calves, with a view to ensure the rational feeding of these animals.

At present apparatus are known which permit of dispensing mixed foods, such as powdered milk in admixture with water, these apparatus being started automatically by the suction produced in a pipeline connected to an artificial teat sucked by the animal. As a rule, these apparatus comprises a programming unit adapted to control the delivery of warm water and powdered milk in predetermined or metered proportions, these metered amounts of powdered milk and water being subsequently mixed together by stirring means in a container or bowl from which the milk thus obtained is sucked by the animals.

The present invention is concerned with an apparatus of the type broadly set forth hereinabove, but extremely simplified in comparison with hitherto known apparatus of this type and adapted to permit an easy adjustment of the proportions of dry substance fed with water at each cycle of operation of the apparatus, that is, the richness of the food delivered to the animal.

To this end, the apparatus for dispensing artificial food to young animals comprises a device for automatically supplying under constant proportions and as the food is consumed, a container connected to at least one artificial teat, on the one hand with a food constituent or product in powder form such as powdered milk contained in a hopper, and on the other hand with a liquid such as water, and a device for dissolving or mixing in said container the powder product in or with the liquid before the solution or mixture reaches the teat, this apparatus being characterised in that the outlet opening of the hopper containing the powdered food is at a higher level than the inlet opening of the container, these two openings being offset laterally to each other; a substantially horizontal conveyor interposed between said two openings whereby, when said conveyor is started by a driving motor, it draws from underneath said hopper a layer of powder product and discharge same into the container, the lower portion of the lateral wall of said hopper, on the side leading or adjacent to said container, having formed above said conveyor a notch closed by a sliding shutter the position of which is vertically adjustable above said conveyor to permit the adjustment of the thickness of said layer of powder product which is transferred by said conveyor.

The apparatus according to this invention permits of adjusting in a particularly simple manner the proportion of dry substance in the mixture delivered to the animal by adjusting accordingly the vertical position of sliding shutter controlling the outlet of said hopper.

In order to afford a clearer understanding of this invention and of the manner in which the same may be carried out in practice, reference will now be made to the accompanying drawings showing diagrammatically by way example a typical form of embodiment of this invention. In the drawings.

Figure 1:
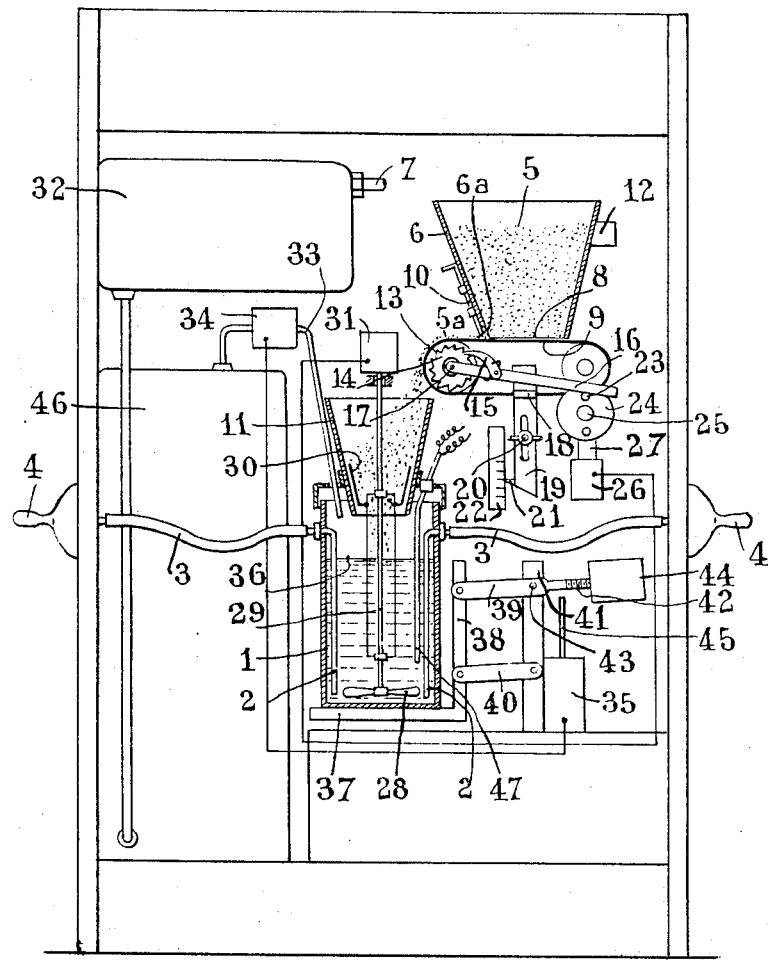
FIGURE 1 is a diagrammatic elevational view showing in fragmentary vertical section an apparatus constructed according to the teachings of this invention.

The apparatus illustrated in FIGURE 1 comprises a container 1 connected through dipper pipes 2 and flexible hoses 3 to artificial teats or udders 4, and means for automatically feeding said container as the apparatus is operated, with constant proportions on the one hand of powdered food such as powdered milk 5 contained in a hopper 6, and on the other hand of a liquid such as water, the container 1 incorporating means for dissolving in or with the liquid the powdered food before the solution or mixture is delivered to the teats 4.

The outlet opening 8 (lower or small-base opening) of said hopper 6 is at a higher level than the inlet opening (upper or large-base opening) of container 1, and this hopper 6 is offset laterally in relation to the container. The hopper outlet opening 8 overlies an endless conveyor belt 9 adapted when operated to extract from the hopper 6 a layer of powdered foodstuff 5a and to discharge same into the container 1.

The lower portion of the wall of hopper 6 which is nearest to the container 1 has a notch or like aperture 6a formed therein, this notch being adapted to be more or less closed by a movable, vertically sliding adjustable shutter 10 overlying the conveyor belt 9 to permit the adjustment of the thickness of the powder layer 5a deposited thereon.

The layer of powdered product 5a is discharged by the endless conveyor belt 9 into a funnel 11 of which the lower end projects through the upper opening of container 1.

An electromagnetic vibrator 12 is mounted on the hopper 6 for preventing the powder 5 from adhering to the inner wall of the hopper.

Of course, a similar device may be associated with the funnel 11, if desired.

In this specific form of emdodiment the belt-driving roller 13 of the conveyor belt 9 may be actuated by a pawl-and-ratchet device comprising a ratchet wheel 14 rotatably rigid with this roller 13 and having its companion pawl 15 pivotally mounted on an arm 16 adapted to pivot in turn about the common shaft 17 carrying the roller 13 and ratchet wheel 14.

The arm 16 is oscillated by a cam device adapted periodically to move this arm 16 away from a stop 18, a suitable return force such as gravity constantly urging the arm 16 against the stop 18.

The position of said stop 18 is preferably adjustable to permit the proper setting of the amplitude of oscillation of arm 16 and, therefore, of the velocity at which the conveyor belt 9 is driven.

The stop 18 is mounted to this end on a vertical rod 19 adapted to slide across said arm 16 and to be locked in the desired vertical position by means of a screw 20 or the like.

An index 21 is carried by the rod 19 and registers with a graduated scale 22.

The cam means provided for periodically lifting the arm 16 off the stop 18 consists of a stud 23 mounted eccentrically on a rotary disc 24 having its shaft 23 parallel to the shaft 17. The cam disc 24 is rotatably driven from an electromotor 26 through a reduction gearing 27.

The stud 23 may be detachably mounted on the cam disc 24, if desired; moreover, means may be provided on said cam disc 24 for interchangeably securing thereto other similar studs 23 at spaced angular intervals and at a same radial spacing from the axis of shaft 25, whereby the frequency of oscillation of arm 16 may be increased or reduced at will according to the number of studs 23 carried by said disc 24.

Rotatably mounted in the container 1 is a multibladed screw agitator 28 adapted to stir the liquid and thus either dissolve the powder falling into the container or mix this powder with the liquid.

The driving shaft 29 of this screw extends through the container 1 upwardly and axially through the overlying funnel 11, and is advantageously provided with another stirring member 30 which, by revolving in the funnel 11, prevents the powder falling from the conveyor belt 9 from agglutinating or forming lumps therein.

The shaft 29 is driven from a motor 31 mounted on the frame structure of the apparatus above the funnel 11.

The container 1 is supplied with water from a mains pipe line 7 through a dispensing pipe 33 under the control of a suitable electromagnet- or solenoid-operated valve 34.

The opening of valve 34 and the starting of electromotors 26 and 31 are controlled preferably by the same switch means 35 when the level 36 of the food solution or mixture in container 1 falls below a predetermined value as the animals suck this solution or mixture through the pipes 2, hoses 3 and teats 4.

The closing of the electromagnet- or solenoid-operated valve 34, and the de-energisation of motors 26 and 31, are controlled by the same switch means 35 when the level of the foodstuff solution in the container 1 has attained a predetermined maximum value as shown at 36.

A time-lag device of any suitable and known type may be inserted in the control circuit of motor 31 whereby when the switch 35 has been turned off, thus stopping the motor 26 and cutting off the valve 34, the motor 31 will continue to operate during a short time period for dissolving the last amount of powder discharged by the belt 9 into the container 1.

To actuate the switch 35 a mechanism responsive to the weight of solution in the container 1 may be used.

To this end, the container 1 is mounted on a tray 37 having a pair of parallel lateral uprights 38 connected through a pair of parallel links 39, 40 to a fixed vertical post 41 on which they are pivoted by means of a pin 43, whereby each upright 38 with the corresponding links 39, 40 constitute with the post 41 a parallel linkage.

On a substantially horizontal rod 42 rotatably solid with the pivot pin 43 and therefore with links 39 is a counterweight 44 adapted to balance the weight of container 1 and the solution contained therein.

This counter-weight 44 is preferably adjustable along the rod 42.

Switch 35 comprises a control rod 45 projecting upwards beneath the rod 42.

Under these conditions, as the level 36 of the solution in the container 1 drops, the container becomes lighter in weight and rises together with the tray 37 while the counterweight 44 moves downwardly until its rod 42 actuates the control rod 45 of switch 35.

The sinking of control rod 45 into switch 35 is attended by the closing of the various electrical circuits not shown and therefore by the opening of valve 34 and the starting of motors 26 and 31.

As a result, the container 1 receives water through the pipe 33, with a pre-adjusted and constant output, and powder from the hopper 5 through the funnel 11, this powder being dissolved or mixed with the water by the multibladed screw 28.

The feeding of water and powdered food to the container 1 and the stirring thereof by the screw 28 are continued until the solution resumes its initial level 36, that is, until the weight of the container and its content is sufficient to move the counter-weight 42 upwards and the rod 42 away from the switch control rod 45 which is responsive to a return spring (not shown) to open the electrical circuits on the one hand of the electromagnetic- or solenoid-operated valve 34 to close same and, on the other hand, of the motors 26 and 31 which are stopped in succession as already explained hereinabove.

Preferably, if the water supply main duct 7 delivers water under a certain pressure, a cistern or tank 32 is inserted in the hydraulic circuit between the mains duct 7 and the electromagnetic or solenoid-operated valve 34, at a level higher than that of container 1, adequate and known means being provided for maintaining a constant water level under the atmospheric pressure in said cistern 32. Thus, water is delivered to the valve 34 under a relatively low and strictly constant pressure, whereby the rate of delivery of water to the container 1 can be adjusted with a high degree of precision.

Since the mechanism for supplying the powdered food to the container is scarcely sensitive to disturbances likely to cause an undesired agglutination of the powder (due as a rule to atmospheric humidity which is a variable factor), the means for adjusting the amount of powder discharged by the endless conveyor belt 9 into the funnel 11 permit of properly regulating the degree of concentration of the food solution prepared in container 1.

An electrical water heater 46 adapted to deliver water at a constant temperature, for example 38° C. to the container 1, is advantageously interposed between the constant-level cistern 32 and the valve 34.

According to an alternate form of embodiment (not shown) a constant-level device of the type described hereinabove in connection with cistern 32 may be incorporated in the heater 46, and in this case the two tanks 32 and 46 may form a single and same tank (not shown) disposed above the container 1.

In the container 1 an electrical heating element 47 if desired with a built-in thermostat, may be mounted to keep the food solution at a predetermined temperature, for example 37° C., so that the animals cannot suck a food mixture the temperature of which is not at the desired valve, even if they resume sucking after a relatively long hold-up of the apparatus.

The container 1 is surrounded with a suitable heat-insulation or lagging (not shown in the drawings).

Figure 2:
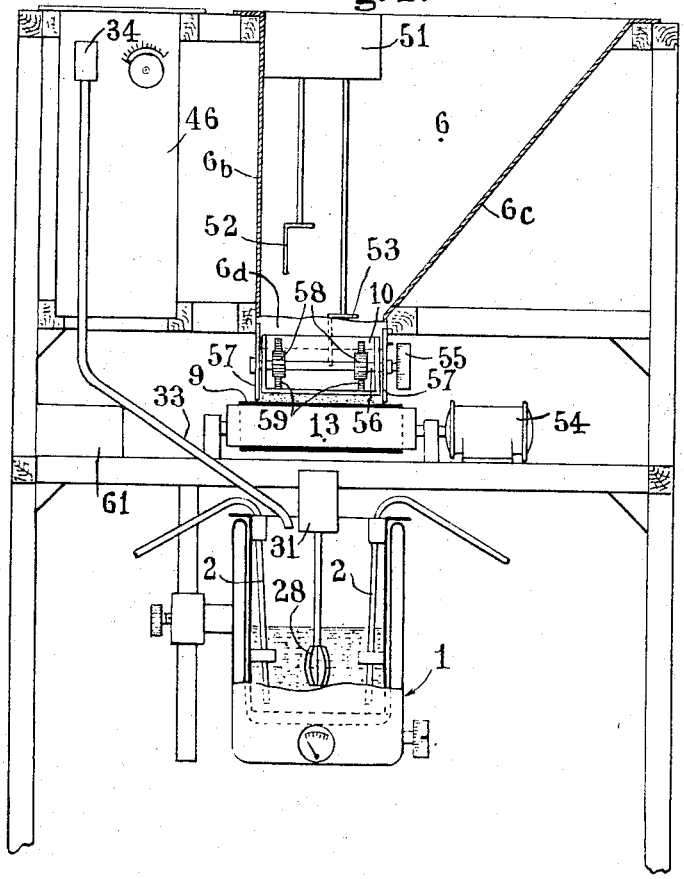
FIGURE 2 is a fragmentary part-elevational, part-sectional view of the apparatus constituting a modified form of embodiment of the present invention.
Figure 3:
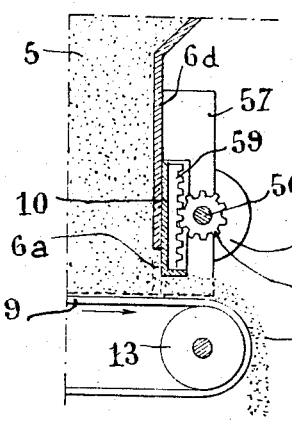
FIGURE 3 is a fragmentary section showing on a larger scale a detail of the lower and front end of the hopper containing the pulverulent food substance shown in FIGURE 2.

A modified form of embodiment of the apparatus according to this invention will now be described with reference to FIGURES 2 and 3 of the accompanying drawings, wherein the components similar to those shown in FIGURE 1 are designated by the same reference numerals.

The supply hopper 6 advantageously comprises a vertical wall 6b and an inclined wall 6c. The level of the powdered food, for example powdered milk, in the hopper 6 is detected by a capacitive level feeler 51 comprising an upper electrode 52 and a lower electrode 53. When the dry material in the hopper 6 drops to the lower electrode 53 the feeler 51 automatically starts the feed device to restore the level to the value whereat the upper electrode 52 is actuated to stop the filling operation.

Underneath the hopper 6 is an endless conveyor belt 9 passing over the driving or power roller 13 driven from a motor and reduction-gear assembly 54. The lower and front wall 6d of hopper 6 has a rectangular notch 6a formed therein which is closed more or less completely by the vertically adjustable sliding shutter 10. The vertical position of this shutter 10 is controlled by means of an adjustment knob 55 carrying a vernier scale and rigid with a horizontal shaft 56 rotatably mounted on a pair of vertical flanges or plates 57 and provided with a pair of pinions 58 in constant meshing engagement with corresponding vertical racks 59 rigid with the shutter 10.

The various operative component elements of the apparatus, that is, the motor 54 driving the endless conveyor belt 9, the electromagnetic- or solenoid-operated valve 34 and the motor 31 driving the agitator 28 are electrically controlled with the proper timing during the operating cycle by means of a programming unit shown diagrammatically at 61.

The apparatus is closed by a door (not shown in the drawings) provided with apertures through which the adjustment and control members of the apparatus are visible.

In this very simplified form of embodiment during a cycle (that is, when an animal produces a suction in the pipe 2) the programming unit 61 controls the opening of valve 34 and the starting of motor 54 during a pre-determined time period. Thus, the operator may vary at will the richness of the food delivered to the animal by turning in the corresponding direction the adjustment knob 55 carrying the graduated scale, so as to vary the cross-sectional area of the passage for the dry material at the bottom of hopper 6. Under these conditions the richness of the food can be adjusted very easily as a function of the average weight of the animals.

Figure 4:
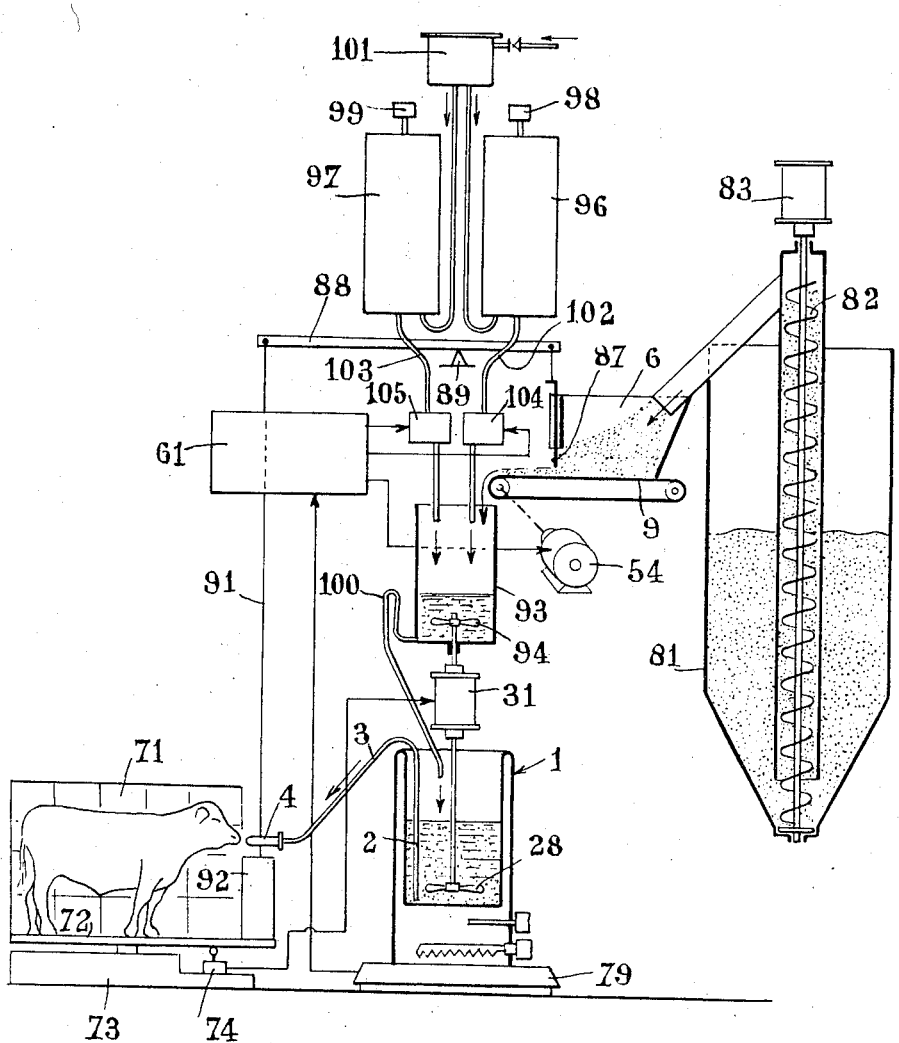
FIGURE 4 is a general diagram showing the principle of operation of another modified form of embodiment of the apparatus.

Now reference will be made to FIGURE 4 showing an apparatus constructed according to this invention and adapted to vary the concentration of dry material in the mixture to be delivered to the animal as a function of the animal's weight.

This apparatus comprises a box 71 mounted on the pan 72 of a main scale 73.

The dry material, for example powdered milk, which is to constitute the food ingredient to be delivered to the animal, is kept in a main hopper 81 from which it is transferred by an endless vertical screw conveyor 82 driven from an electro-motor 83 to the feed hopper proper 6. The bottom of this feed hopper 6 is closed by a shutter 87 suspended from one end of a balance-beam like lever 88 fulcrumed on a knife-edge 89. The opposite end of lever 88 is connected through a rod 91 to the triangulation system 92 of scale 73.

Beneath the end of conveyor belt 9 is a first mixer 93 having its agitator 94 rotatably driven from an electromotor 31 energised under the control of a normally open switch 74 mounted under the pan 72 of scale 73.

The apparatus further comprises two water heaters 96 and 97 responsive to thermostats 98 and 99 respectively. These water heaters 96 and 97 are supplied with cold water from a constant-level cistern 101. The temperature of the water issuing from heater 96 is adjusted at a value slightly higher than that issuing from heater 97. Thus, these temperature values may be respectively 60° C. (heater 96) and 25° C. (heater 97). Pipe lines 102 and 103 connect the outlets of heaters 96 and 97 respectively to the aforesaid mixer 93 having its bottom provided with a siphon 100. Electromagnetic- or solenoid-operated valves 104 and 105 are connected to these pipe lines 102 and 103 respectively.

The apparatus also comprises the mixing container 1 disposed beneath the siphon 100 and mounted on a scale 79.

A programming unit 61 adapted to be started under the control of scale 79 controls the energisation of motor 54 driving the conveyor belt 9 and also the energisation of the valves 104 and 105.

The operation of the apparatus described hereinabove will now be described in detail.

Assuming that a sucking animal enters the box 71, the consequent downward movement of pan 72 of scale 73 will close the contact of switch 74 and start the motor 31. Both agitators 28 and 94 are thus operated. Besides, a certain amount of liquid remains in mixing container 1 after the preceding operation or sucking period. Thus, the animal begins to suck the teat 4 through the pipe 2 dipping to the bottom of container 1. When the level of the food mixture in container 1 has dropped sufficiently the scale 79 controlling the cycle delivers a signal to the programming unit 61. This programming unit 61 will thus start the motor 54 to drive the conveyor belt 9 and open the valve 104 alone. The shutter 87 controlling the output of dry material is thus raised through the medium of the pivoting lever 88 to a height proportional to the animal's weight; therefore, the output of dry substance issuing from the hopper 6 is proportional to this weight. The proportionality factor is subordinate to the position of the fulcrum 89 and means may be provided for adjusting this position at will. The dry material is carried along by the belt 9 and falls into the upper mixer 93 in which it is mixed up with water heated at 60° C. and supplied by the first heater 96. Since the water is at a relatively high temperature, the occurrence of agglutinated powder lumps in the mixture is safely avoided.

At the end of a time period pre-adjusted by the programming unit 61 the motor 54 is stopped by this unit which also closes the valve 104 and opens the other valve 105. Water at a lower temperature (for instance 25° C) flows from the heater 97 into the mixer 93. As a consequence, the temperature of the mixture contained in this mixer 93 is lowered, the agitator 94 being kept rotating. The volume of this colder water is dependent on the time during which the valve 105 is kept open, as controlled by the programming unit.

At a certain moment the liquid in mixer 93 drops to the level of siphon 100 and any liquid mixture contained in this mixer 93 will flow into the underlying container 1. Thus, the mixture in this container 1 will have a concentration of dry food material which corresponds to the weight of the animal and furthermore this mixture will have the desired temperature and be stirred by the agitator 28. Under these conditions the animal can keep sucking as before and when the liquid level in container 1 has been dropped sufficiently the scale 79 emits another signal transmitted to the programming unit 61 and the cycle is resumed. When the animal has satisfied its hunger and leaves the pan 72 of the scale, switch 74 opens and stops the motor 31.

Figure 5:
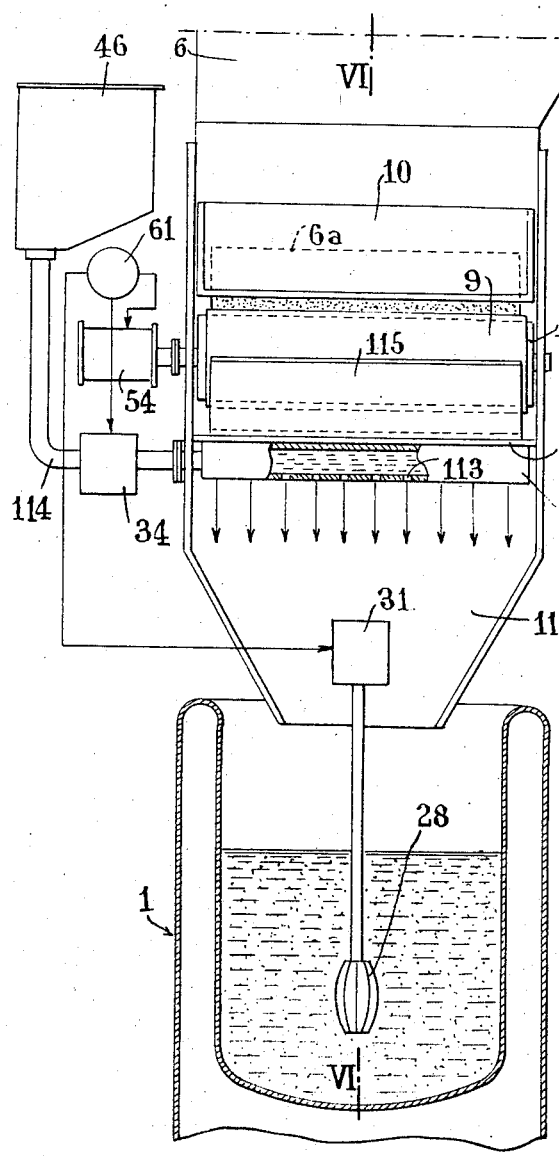
FIGURE 5 is a diagrammatic elevational view with parts shown in section, to illustrate another modified form of embodiment of the apparatus of this invention.
Figure 6:
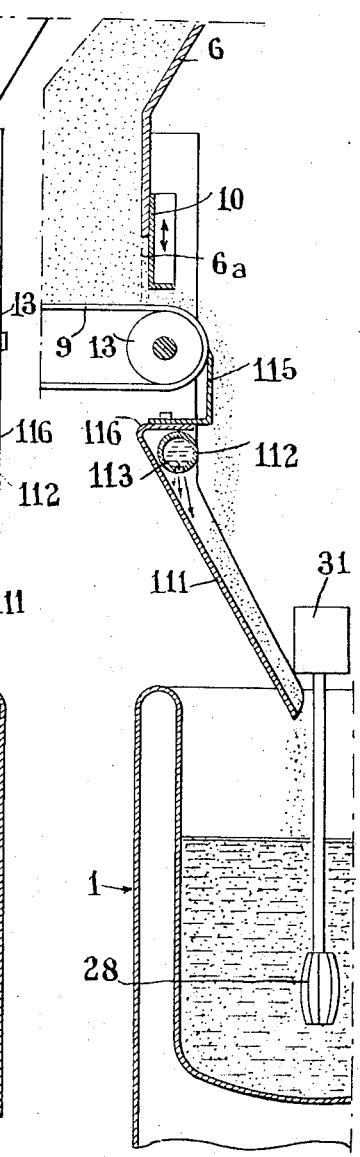
FIGURE 6 is a vertical section taken along the line VI—VI of FIGURE 5.

Now reference will be made to FIGURES 5 and 6 showing a different form of embodiment of the apparatus according to this invention.

In this modified apparatus the powdered food delivered by the conveyor belt 9 falls onto an inclined apron 111 underlying the front or delivery end of the endless conveyor belt so as to direct the powdered milk into the mixing container 1. A duct 112 perforated along its lowermost generatrix as shown at 112 extends horizontally across the upper portion of apron 111, beneath the driving roller 13 at the front or delivery end of conveyor belt 9. This duct 113 is connected to the source 46 of warm water through a pipe line 114 in which the electromagnetic- or solenoid-operated valve 34 is inserted.

As clearly shown in FIGURE 6 the duct 113 is disposed under a horizontal, in-turned strip 116 constituting the upper end of apron 111, this strip 116 having a vertical up-turned extension 115, as shown. This vertical extension 115 has a bevelled upper edge disposed tangent to the conveyor belt 9 and acting as a doctor blade in conjunction therewith.

The cycle of operation of this apparatus takes place as follows:

At the beginning of the cycle, when the programming unit 61 is started, it controls firstly the opening of valve 34 whereby the duct 112 is fed with heated water. This water flows through the holes 113 in the form of a regular sheet across the entire width of apron 111 and is directed into the underlying container 1.

Shortly after opening this valve 34 the programming unit 61 controls the operation of motor 54 whereby the conveyor belt 9 will carry along a layer of powdered milk, the thickness of this layer being controlled by the positon of shutter 10. The powdered milk falls vertically from the end of conveyor belt 9, whereat it is scraped by the doctor 115, onto the inclined apron 111 on which the water sheet has been formed beforehand, and is entrained thereby into the mixing container 1. The contact on this apron 11, between the water sheet issuing from the holes 113 of duct 112 and the milk powder sheet of equal width falling from the belt 9 permits of mixing beforehand the whole of the powder component, thus improving considerably the quality of the end mixture formed in container 1 by the agitator 28 driven from motor 31.

At the end of the cycle the programming unit 61 controls firstly the de-energisation of motor 54 to discontinue the delivery of powdered milk onto the apron 111. The latter is then cleaned by the water sheet still delivered by the perforated duct 112, until the valve 34 is closed in turn by the programming unit 61.

If desired, the duct 112 delivering water to the apron 111 may be arranged in a different manner. Thus, it may comprise a single longitudinal slot instead of a plurality of holes 113. Alternately, a curved or partially curved duct may be used to this end in order to direct certain water streamlets towards the center of the apron 111.

Furthermore, this apron 111 may be flat with bent edges or have curved cross-sectional contour.

Alternately the apparatus could comprise, instead of endless conveyor belt, another type of conveyor for example a vibrating conveyor.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and appended claims.

What we claim is:

1. Apparatus for dispensing artificial food to sucking animals, comprising a container having an inlet opening, at least one connected to said container, a hopper having a lateral wall and a lower outlet opening and containing powder food such as powdered milk, the outlet opening of the hopper containing the food powder being disposed at a higher level than the inlet opening of said container, these inlet and outlet openings being offset laterally from each other, a substantially horizontal endless belt conveyor interposed under the hopper between said two openings, a motor for driving said conveyor to draw a layer of powder from the bottom of said hopper and discharge same into said container, a notch formed in the lower portion of the lateral wall of said hopper, on the side opposite to said container, above said conveyor, a shutter vertically movable above said conveyor and partially closing said notch to permit the adjustment of the thickness of said powder layer transferred by said conveyor, means for supplying said container with liquid such as water, and means for dissolving or mixing in said container said powder and said liquid before the solution or mixture reaches the teat.

2. Apparatus according to claim 1, further comprising a funnel interposed between said conveyor and said container, a shaft rotatably mounted in said funnel and projecting into said container and a pair of agitators carried by said shaft and revolving the one in said funnel and the other in the liquid contained in said container.

3. Apparatus according to claim 1, comprising a driving roller of said conveyor, and a pawl-and-ratcher mechanism for rotating said roller, said mechanism comprising a second shaft, a ratchet wheel mounted on said second shaft, and arm fulcrumed about said second shaft of said ratchet wheel, a pawl mounted on said arm and engaging said ratchet wheel, a stop against which said arm is constantly urged by a suitable force, a cam disc adapted periodically to move said arm away from sid stop and means for adjusting the position of said stop to vary at will the feed rate of said conveyor.

4. Apparatus according to claim 3, in which said cam disc comprises a rotary disc means, at least one stud secured in a suitable radial position to said rotary disc means and means for detachably securing other similar studs thereto.

5. Apparatus according to claim 1, comprising rack means solid with said adjustable shutter, a third shaft rotatably mounted on said hopper, pinions rigid with said third shaft and in constant meshing engagement with said rack means, a control knob rigid with said third shaft and a vernier provided on said control knob.

6. Apparatus according to claim 1, comprising a scale adapted to carry the sucking animal, a triangulation system of said scale, a pivot pin, a lever fulcrumed about said pivot pin, one end of said lever being secured to the adjustable shutter adapted more or less to close the notch formed in the base of said hopper and the opposite end of said level being connected to the triangulation system of said scale so as to vary the content of dry material of the artificial food delivered by the apparatus, as a function of the animal's weight.

7. Apparatus according to claim 1, further comprising, beneath the delivery end of said conveyor and above said container an inclined apron 111 adapted to be supplied with powdered food falling thereupon from said conveyor, a supply of liquid, a duct located at the upper portion of said apron and beneath the delivery end of said conveyor, and connected to said supply of liquid, provided in said duct and adapted to dispense the liquid in sheet form onto said apron as the powdered food is caused to fall likewise in sheet form upon said apron, whereby said powdered food is entrained into said container.

8. Apparatus according to claim 7, comprising a pipeline connected between said supply of liquid and said duct, an electromagnetic valve inserted in said pipeline and programming means controlling said valve so that said duct is supplied with liquid during each cycle of operation shortly before said conveyor is started.

References Cited

UNITED STATES PATENTS

| | | | |
|---|---|---|---|
| 2,795,313 | 6/1957 | Hazen | 198—60 |
| 3,037,481 | 6/1962 | Kloss | 119—71 |
| 3,208,431 | 9/1965 | Kloss | 119—51.11 |
| 3,265,036 | 8/1966 | Kloss | 119—51 |
| 3,303,823 | 2/1967 | Cohen | 119—51.11 |
| 3,313,272 | 4/1967 | Moloney | 119—51.11 |
| 3,314,398 | 4/1967 | Legourd | 119—71 |
| 3,331,357 | 7/1967 | Legrain et al. | 119—71 |

ALDRICH F. MEDBERY, *Primary Examiner.*

U.S. Cl. X.R.

119—71